United States Patent
Furusato et al.

(10) Patent No.: US 9,639,059 B2
(45) Date of Patent: May 2, 2017

(54) OPTICAL COMPONENT AND TIMEPIECE

(71) Applicant: SEIKO EPSON CORPORATION, Tokyo (JP)

(72) Inventors: Daiki Furusato, Nagano (JP); Katsumi Suzuki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/933,282

(22) Filed: Nov. 5, 2015

(65) Prior Publication Data

US 2016/0161917 A1    Jun. 9, 2016

(30) Foreign Application Priority Data

Dec. 3, 2014 (JP) ................................. 2014-244846

(51) Int. Cl.
*G04B 39/00* (2006.01)
*G02B 1/16* (2015.01)
*G02B 1/113* (2015.01)

(52) U.S. Cl.
CPC ............ *G04B 39/002* (2013.01); *G02B 1/113* (2013.01); *G02B 1/16* (2015.01); *G04B 39/006* (2013.01)

(58) Field of Classification Search
CPC ........ G04C 10/02; G04B 1/11; G04B 39/002; G04B 39/006; G02B 1/16; G02B 1/113
See application file for complete search history.

(56) References Cited

U.S. PATENT DOCUMENTS

| | | | |
|---|---|---|---|
| 7,212,341 B2 * | 5/2007 | Ikeyama | .................. B32B 7/02 359/582 |
| 8,133,573 B2 | 3/2012 | Jilavi et al. | |
| 2010/0027383 A1 | 2/2010 | Suzuki et al. | |
| 2011/0176396 A1 * | 7/2011 | Suzuki | ................ C03C 17/3435 368/296 |
| 2013/0215513 A1 * | 8/2013 | Liang | ...................... G02B 1/11 359/601 |
| 2014/0335651 A1 * | 11/2014 | Li | ..................... H01L 31/02244 438/98 |

FOREIGN PATENT DOCUMENTS

| | | |
|---|---|---|
| JP | 11-217560 A | 8/1999 |
| JP | 2007-529769 A | 10/2007 |
| JP | 2010-037115 A | 2/2010 |

* cited by examiner

*Primary Examiner* — Sean Kayes
(74) *Attorney, Agent, or Firm* — Global IP Counselors, LLP

(57) ABSTRACT

An optical component includes a base material and a film containing silica particles and conductive transparent metal oxide particles. The conductive transparent metal oxide particles are preferably composed of $SnO_2$. The number-based average particle diameter of the conductive transparent metal oxide particles is preferably 0.8 nm or more and 5.0 nm or less. When the content of the silica particles in the film is represented by Xs (vol %) and the content of the conductive transparent metal oxide particles in the film is represented by Xc (vol %), it is preferred to satisfy the following relationship: $0.003 \leq Xc/Xs \leq 0.12$.

18 Claims, 4 Drawing Sheets

OPTICAL COMPONENT AND TIMEPIECE

BACKGROUND

1. Technical Field

The present invention relates to an optical component and a timepiece.

2. Related Art

In an optical component such as a cover glass for a timepiece, a material having high transparency such as any of various glass materials and various plastic materials is generally used.

On such an optical component, for example, a film such as an antireflection film for the purpose of preventing undesirable light reflection is sometimes provided (see, for example, JP-A-2010-37115).

However, in the related art, adhesion of dirt due to static electricity or the like cannot be effectively prevented while ensuring the light transmittance of the optical component.

SUMMARY

An advantage of some aspects of the invention is to provide an optical component having an excellent antistatic function while having sufficient light transmittance, and also to provide a timepiece including an optical component having an excellent antistatic function while having sufficient light transmittance.

An optical component according to an aspect of the invention includes a base material and a film containing silica particles and conductive transparent metal oxide particles.

According to this configuration, an optical component having an excellent antistatic function while having sufficient light transmittance can be provided.

In the optical component according to the aspect of the invention, it is preferred that the volume resistivity of the constituent material of the conductive transparent metal oxide particles is 100 Ωcm or less.

According to this configuration, the antistatic property of the optical component can be made particularly excellent.

In the optical component according to the aspect of the invention, it is preferred that the conductive transparent metal oxide particles are composed of $SnO_2$.

$SnO_2$ not only has high transparency, but also has a relatively low refractive index, and therefore, has a few effects on the antireflection property. Further, $SnO_2$ is relatively inexpensive and can be easily and stably obtained.

In the optical component according to the aspect of the invention, it is preferred that the number-based average particle diameter of the conductive transparent metal oxide particles is 0.8 nm or more and 5.0 nm or less.

According to this configuration, the antistatic function can be made particularly excellent while making the transparency of the film particularly excellent. Further, the film can be made relatively dense, and the strength of the film and the durability of the optical component can be made particularly excellent.

In the optical component according to the aspect of the invention, it is preferred that the number-based average particle diameter of the silica particles is 0.5 nm or more and 4.0 nm or less.

According to this configuration, a mixing state of the silica particles and the conductive transparent metal oxide particles in the film can be made favorable, and the antistatic function of the optical component can be made particularly excellent. Further, the film can be made relatively dense, and the strength of the film and the durability of the optical component can be made particularly excellent. In addition, the antireflection function and the like of the film can also be made particularly excellent.

In the optical component according to the aspect of the invention, when the number-based average particle diameter of the silica particles is represented by Ds (nm) and the number-based average particle diameter of the conductive transparent metal oxide particles is represented by Dc (nm), it is preferred to satisfy the following relationship: $0.1 \leq Dc/Ds \leq 0.6$.

According to this configuration, a mixing state of the silica particles and the conductive transparent metal oxide particles in the film can be made more favorable, and the antistatic function of the optical component can be made particularly excellent. Further, the film can be made relatively dense, and the strength of the film and the durability of the optical component can be made particularly excellent. In addition, the antireflection function and the like of the film can also be made particularly excellent.

In the optical component according to the aspect of the invention, when the content of the silica particles in the film is represented by Xs (vol %) and the content of the conductive transparent metal oxide particles in the film is represented by Xc (vol %), it is preferred to satisfy the following relationship: $0.003 \leq Xc/Xs \leq 0.12$.

According to this configuration, the antistatic function can be made particularly excellent while making the antireflection function and the like of the film excellent. Further, the film can be made relatively dense, and the strength of the film and the durability of the optical component can be made particularly excellent. In addition, the transparency of the film can be made particularly excellent.

In the optical component according to the aspect of the invention, it is preferred that the thickness of the film is 50 nm or more and 120 nm or less.

According to this configuration, the durability, antistatic function, and the like of the optical component can be made particularly excellent.

In the optical component according to the aspect of the invention, it is preferred that the base material is composed of a material containing at least one member selected from the group consisting of a silicate glass, a sapphire glass, and a plastic.

These materials have excellent transparency, and therefore, the optical property of the optical component can be made particularly excellent. Further, in the case where a film is provided on a base material composed of such a material, the antireflection function is more effectively exhibited.

In the optical component according to the aspect of the invention, it is preferred that the optical component is a cover glass for a timepiece.

Time-displaying members such as a dial plate and hands are generally disposed on a rear surface side of the cover glass, and therefore, the cover glass (optical component) is a member which is strongly required to have visibility of a dial plate and the like through the cover glass (optical component). Therefore, the cover glass is a member in which a problem of decreasing the visibility particularly remarkably occurs when dirt such as dust adheres to the cover glass due to static electricity. Further, in the case where the cover glass is undesirably charged with electricity, due to the effect, the hands such as an hour hand may be deformed, and therefore, a breakdown or the like of the timepiece may be caused due to such deformation. On the other hand, in the case where the invention is applied to a cover glass for a timepiece, the occurrence of the problem as described above can be effectively prevented. Therefore, by applying the invention to a cover glass for a timepiece, the effect of the invention is more remarkably exhibited.

Further, in the optical component according to the aspect of the invention, also an excellent antireflection function is exhibited, and therefore, the visibility of the time-displaying members such as a dial plate and hands disposed on the rear surface side of the cover glass can be made particularly excellent.

A timepiece according to an aspect of the invention includes the optical component according to the aspect of the invention.

According to this configuration, a timepiece including the optical component having an excellent antistatic function while having sufficient light transmittance can be provided.

According to the aspects of the invention, an optical component having an excellent antistatic function while having sufficient light transmittance can be provided, and also a timepiece including the optical component having an excellent antistatic function while having sufficient light transmittance can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

Optical Component

First, an optical component according to the invention will be described.

First Embodiment

Figure 1:
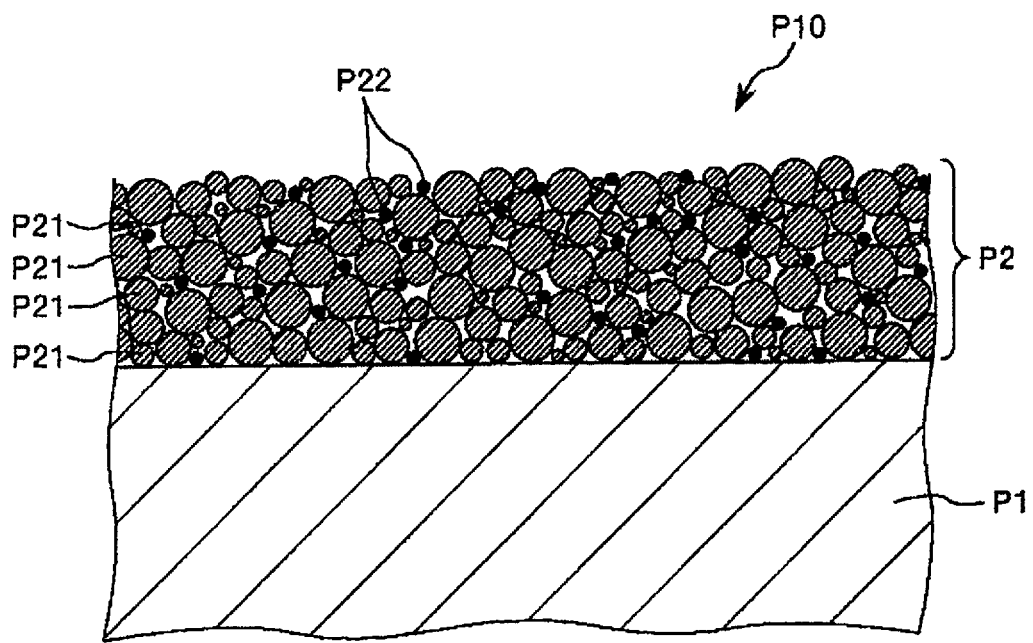
FIG. 1 is a cross-sectional view schematically showing a first embodiment of an optical component according to the invention.
Figure 2:
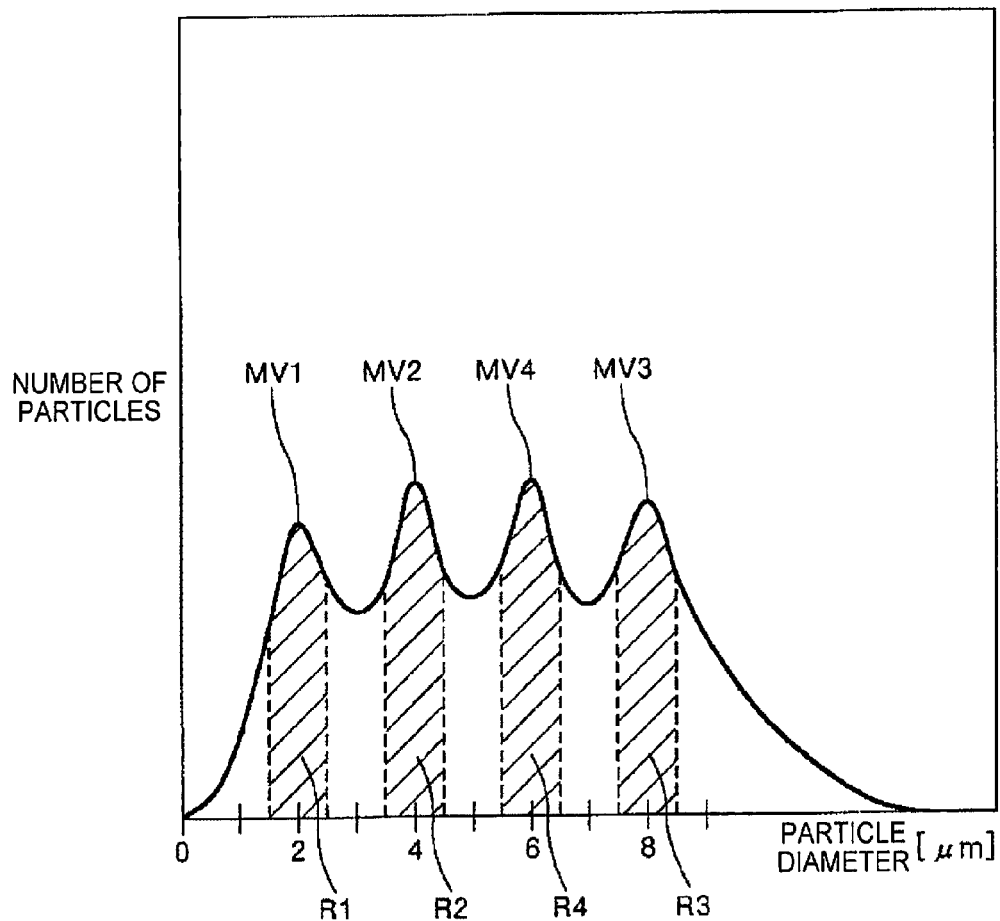
FIG. 2 is a view schematically showing one example of a particle size distribution of silica particles constituting a film of an optical component according to the invention.

FIG. 1 is a cross-sectional view schematically showing a first embodiment of an optical component according to the invention, and FIG. 2 is a view schematically showing one example of a particle size distribution of silica particles constituting a film of an optical component according to the invention.

As shown in FIG. 1, an optical component P10 of this embodiment includes a base material P1 and a film P2 containing silica particles P21 and conductive transparent metal oxide particles P22.

According to such a configuration, the optical component P10 exhibits an antistatic function as a whole. In other words, the film P2 can function as an antistatic film. As a result, for example, the adhesion of dirt such as dust due to static electricity can be prevented, and thus, the optical component P10 can stably exhibit the inherent optical property.

The silica particles P21 and the conductive transparent metal oxide particles P22 are both a material with transparency, and therefore, the transparency and light transmittance of the optical component P10 as a whole can be made sufficiently excellent. Accordingly, the optical property of the optical component P10 can be made sufficiently excellent.

Such an excellent effect is obtained by using the silica particles P21 and the conductive transparent metal oxide particles P22 in combination, and the excellent effect as described above is not obtained by a configuration devoid of either one of these components. That is, in the case where a configuration in which the conductive transparent metal oxide particles are not contained in a film composed of a material containing the silica particles is adopted, a sufficient antistatic function is not obtained. Further, in the case where another conductive material is contained in place of the conductive transparent metal oxide particles in a film composed of a material containing the silica particles, when a sufficient antistatic function is tried to be obtained, for example, the transparency of the film is decreased, and therefore, a problem occurs such that the optical property of the optical component is significantly deteriorated, the durability of the film is significantly deteriorated, or the like. Further, in the case where a configuration in which the silica particles are not contained in a film composed of a material containing the conductive transparent metal oxide particles is adopted, for example, the transparency of the film is decreased, and therefore, the optical property of the optical component is significantly deteriorated.

Further, by including the film P2 containing the silica particles P21 and the conductive transparent metal oxide particles P22, for example, by using silica particles having a given particle size distribution as the silica particles P21, a particularly excellent antireflection function is obtained. In other words, the film P2 can function as an antireflection film. In addition, an excellent antireflection function is obtained with a very simple structure as compared with an antireflection film in the related art.

The reason why such an excellent antireflection function is obtained is considered to be because by including the silica particles P21 and the conductive transparent metal oxide particles P22, a favorable optical interference effect is exhibited.

Further, by including the film P2 containing the silica particles P21 and the conductive transparent metal oxide particles P22, the optical component P10 has an excellent antifogging property. As a result, a decrease in the optical property due to dew condensation or the like can be reliably prevented.

The reason why such an excellent antifogging property is obtained is considered to be because by including the silica particles P21 and the conductive transparent metal oxide particles P22, a fine fractal structure is favorably formed.

Further, in the related art, an optical component is sometimes used by providing a resin film on an optical component main body (base material). However, such a resin film has a problem that the abrasion resistance is low, and for example, when dirt adheres to the surface of the optical component, a wiping operation cannot be performed, and the like. On the other hand, the film P2 as described above also has excellent abrasion resistance, and therefore, a wiping operation can also be favorably performed.

Such a film P2 can be more easily formed by, for example, a coating method or the like as described in detail later.

Due to this, the optical component P10 having an excellent antistatic function and the like can be obtained with high productivity without using a large and expensive apparatus. Further, the production cost of the optical component P10 can also be decreased.

Base Material

The base material P1 constitutes a main part of the optical component P10 and is generally a member which has light transmittance.

The refractive index of the base material P1 for a light with a wavelength of 589 nm is preferably 1.43 or more and 1.85 or less, more preferably 1.45 or more and 1.78 or less.

According to this, the optical property of the optical component P10 can be made particularly excellent.

The constituent material of the base material P1 is not particularly limited, and for example, various glasses, various plastics, and the like can be used. However, it is preferably a material containing at least one member selected from the group consisting of a silicate glass (a quartz glass or the like), a sapphire glass, and a plastic.

These materials have excellent transparency. Further, in the case where the film P2 is provided on the base material P1 composed of such a material, the antireflection function attributed to the film P2 is more effectively exhibited.

In particular, in the case where the base material P1 contains at least one of a silicate glass and a sapphire glass, excellent optical properties such as particularly excellent light transmittance and a moderate refractive index are obtained, and also the adhesiveness thereof to the film P2 is made particularly excellent, and thus, the durability of the optical component P10 as a whole can be made particularly excellent.

Examples of a plastic material constituting the base material P1 include various thermoplastic resins and various thermosetting resins, and specific examples thereof include polyolefins such as polyethylene, polypropylene, ethylene-propylene copolymers, and ethylene-vinyl acetate copolymers (EVA), cyclic polyolefins (COP), modified polyolefins, polyvinyl chloride, polyvinylidene chloride, polystyrene, polyamides (for example, nylon 6, nylon 46, nylon 66, nylon 610, nylon 612, nylon 11, nylon 12, nylon 6-12, and nylon 6-66), polyimides, polyamideimides, polycarbonate (PC), poly-(4-methylpentene-1), ionomers, acrylic resins, polymethyl methacrylate, acrylonitrile-butadiene-styrene copolymers (ABS resins), acrylonitrile-styrene copolymers (AS resins), butadiene-styrene copolymers, polyoxymethylene, polyvinyl alcohol (PVA), ethylene-vinyl alcohol copolymers (EVOH), polyesters such as polyethylene terephthalate (PET), polybutylene terephthalate (PBT), and polycyclohexane terephthalate (PCT), polyether, polyether ketone (PEK), polyether ether ketone (PEEK), polyether imide, polyacetal (POM), polyphenylene oxide, modified polyphenylene oxide, polysulfone, polyether sulfone, polyphenylene sulfide, polyarylate, aromatic polyesters (liquid crystal polymers), polytetrafluoroethylene, polyvinylidene fluoride, other fluororesins, various thermoplastic elastomers such as styrene-based, polyolefin-based, polyvinyl chloride-based, polyurethane-based, polyester-based, polyamide-based, polybutadiene-based, trans-polyisoprene-based, fluororubber-based, and chlorinated polyethylene-based elastomers, epoxy resins, phenolic resins, urea resins, melamine resins, unsaturated polyesters, silicone-based resins, urethane-based resins, poly-para-xylylene resins such as poly-para-xylylene, poly-monochloro-para-xylylene, poly-dichloro-para-xylylene, poly-monofluoro-para-xylylene, and poly-monoethyl-para-xylylene, and also include copolymers, blends, and polymer alloys composed mainly of these materials. Among these, one type or two or more types in combination (for example, as a blend resin, a polymer alloy, a stacked body, or the like) can be used.

Film

The film P2 is composed of a material containing silica particles P21 and conductive transparent metal oxide particles P22.

Silica Particles

The number-based average particle diameter of the silica particles P21 constituting the film P2 is not particularly limited, but is preferably 0.5 nm or more and 4.0 nm or less, more preferably 1.0 nm or more and 2.0 nm or less.

According to this, a mixing state of the silica particles P21 and the conductive transparent metal oxide particles P22 in the film P2 can be made favorable, and the antistatic function of the optical component P10 can be made particularly excellent. Further, the film P2 can be made relatively dense, and the strength of the film P2 and the durability of the optical component P10 can be made particularly excellent. In addition, the antireflection function and the like of the film P2 can also be made particularly excellent.

As shown in FIG. 2, it is preferred that the silica particles P21 contained in the film P2 have a first local maximum MV1 in the range of 1.5 nm or more and 2.5 nm or less (a first range R1), a second local maximum MV2 in the range of 3.5 nm or more and 4.5 nm or less (a second range R2), and a third local maximum MV3 in the range of 7.5 nm or more and 8.5 nm or less (a third range R3) in a number-based particle size distribution.

Because of having such a particle size distribution, a particularly excellent antireflection function is obtained.

The reason why such an excellent antireflection function is obtained is considered to be because by including the silica particles P21 having a particle size distribution as described above, a more favorable optical interference effect is exhibited.

Further, by including the silica particles P21 having a particle size distribution as described above, the optical component P10 has also a particularly excellent antifogging property.

The reason why such an excellent antifogging property is obtained is considered to be because by including the silica particles P21 having a particle size distribution as described above, a fine fractal structure is more favorably formed.

Further, the density (the filling ratio of the silica particles P21) of the film P2 can be made high, and thus, the strength of the film P2 and the durability of the optical component P10 can be made excellent.

The ratio of the silica particles P21 having a particle diameter of 1.5 nm or more and 2.5 nm or less (the ratio of the silica particles P21 falling within the first range R1) to the sum of the volumes of the silica particles P21 constituting the film P2 is preferably 5% by volume or more and 30% by volume or less, more preferably 10% by volume or more and 25% by volume or less.

According to this, the film P2 can be made relatively dense while making the antireflection function and the like of the film P2 particularly excellent, and the strength of the film P2 and the durability of the optical component P10 can be made particularly excellent.

The ratio of the silica particles P21 having a particle diameter of 3.5 nm or more and 4.5 nm or less (the ratio of the silica particles P21 falling within the second range R2) to the sum of the volumes of the silica particles P21 constituting the film P2 is preferably 10% by volume or more and 40% by volume or less, more preferably 15% by volume or more and 35% by volume or less.

According to this, the film P2 can be made relatively dense while making the antireflection function and the like of the film P2 particularly excellent, and the strength of the film P2 and the durability of the optical component P10 can be made particularly excellent.

The ratio of the silica particles P21 having a particle diameter of 7.5 nm or more and 8.5 nm or less (the ratio of the silica particles P21 falling within the third range R3) to the sum of the volumes of the silica particles P21 constituting the film P2 is preferably 30% by volume or more and 60% by volume or less, more preferably 35% by volume or more and 55% by volume or less.

According to this, the film P2 can be made relatively dense while making the antireflection function and the like of the film P2 particularly excellent, and the strength of the film P2 and the durability of the optical component P10 can be made particularly excellent.

In the number-based particle size distribution, the range of the particle diameter in which the first local maximum MV1 is present may be 1.5 nm or more and 2.5 nm or less, but is preferably 1.6 nm or more and 2.4 nm or less, and more preferably 1.8 nm or more and 2.2 nm or less.

According to this, the antireflection function and the like of the film P2 can be made particularly excellent.

In the number-based particle size distribution, the range of the particle diameter in which the second local maximum MV2 is present may be 3.5 nm or more and 4.5 nm or less, but is preferably 3.6 nm or more and 4.4 nm or less, and more preferably 3.8 nm or more and 4.2 nm or less.

According to this, the antireflection function and the like of the film P2 can be made particularly excellent.

In the number-based particle size distribution, the range of the particle diameter in which the third local maximum MV3 is present may be 7.5 nm or more and 8.5 nm or less, but is preferably 7.6 nm or more and 8.4 nm or less, and more preferably 7.8 nm or more and 8.2 nm or less.

According to this, the antireflection function and the like of the film P2 can be made particularly excellent.

It is preferred that the silica particles P21 further have a fourth local maximum MV4 in the range of 5.5 nm or more and 6.5 nm or less (a fourth range R4) in addition to the above-mentioned first local maximum MV1, second local maximum MV2, and third local maximum MV3 in the number-based particle size distribution.

According to this, the antireflection function and the like of the film P2 can be made particularly excellent.

The ratio of the silica particles P21 having a particle diameter of 5.5 nm or more and 6.5 nm or less (the ratio of the silica particles P21 falling within the fourth range R4) to the sum of the volumes of the silica particles P21 constituting the film P2 is preferably 20% by volume or more and 30% by volume or less, more preferably 22% by volume or more and 28% by volume or less.

According to this, the film P2 can be made relatively dense while making the antireflection function and the like of the film P2 particularly excellent, and the strength of the film P2 and the durability of the optical component P10 can be made particularly excellent.

In the number-based particle size distribution, the range of the particle diameter in which the fourth local maximum MV4 is present may be 5.5 nm or more and 6.5 nm or less, but is preferably 5.6 nm or more and 6.4 nm or less, and more preferably 5.8 nm or more and 6.2 nm or less.

According to this, the antireflection function and the like of the film P2 can be made particularly excellent.

The measurement of the particle size distribution can be performed by using various methods, for example, a dynamic light scattering method, a laser diffraction method, an image analysis method, a gravity sedimentation method, and the like, but is preferably performed by using a laser diffraction method.

According to this, the particle size distribution can be obtained more easily. Further, in either case of a dry process or a wet process, the measurement can be favorably performed, and a relatively large amount of a sample can be treated at a time.

Examples of an apparatus which can be used for measuring the particle size distribution include a single nanoparticle size analyzer (IG-1000) manufactured by Shimadzu Corporation.

The content of the silica particles P21 in the film P2 (the content thereof to the total solid components) is preferably 90% by volume or more and 99.5% by volume or less, further more preferably 92% by volume or more and 99% by volume or less.

According to this, the antistatic function, antireflection function, and the like can be made particularly excellent while making the transparency of the film P2 particularly excellent.

Conductive Transparent Metal Oxide Particles

The film P2 contains conductive transparent metal oxide particles P22 composed of a metal oxide with electrical conductivity and transparency.

By including such conductive transparent metal oxide particles P22 along with the silica particles P21, an antistatic function and the like can be imparted while making the optical property of the optical component P10 excellent.

In general, a metal oxide (particularly, a conductive metal oxide) has excellent chemical stability, and undesirable denaturation or the like thereof hardly occurs in the film P2. Therefore, the function as described above can be exhibited stably over a long period of time.

The conductive transparent metal oxide particles P22 constituting the film P2 may be any as long as it is composed of a transparent metal oxide with electrical conductivity, however, the volume resistivity of the constituent material of the conductive transparent metal oxide particles P22 is preferably 100 Ωcm or less.

According to this, the antistatic property of the optical component P10 can be made particularly excellent.

Examples of the metal oxide (transparent metal oxide) constituting the conductive transparent metal oxide particles P22 include $In_2O_3$, ZnO, CdO, $Ga_2O_3$, and $SnO_2$, materials obtained by doping any of the above-mentioned compounds with tin (Sn), antimony (Sb), aluminum (Al), gallium (Ga), or the like (for example, ITO (Sn-doped $In_2O_3$), AZO (Al-doped ZnO), GZO (Ga-doped ZnO), and the like), and materials containing two or more compounds selected therefrom (for example, IZO ($In_2O_3$—ZnO), IGZO ($In_2O_3$—$Ga_2O_3$—ZnO), and the like).

Above all, as the constituent material of the conductive transparent metal oxide particles P22, $SnO_2$ is preferred. $SnO_2$ not only has high transparency, but also has a relatively low refractive index, and therefore, has a few effects on the antireflection property. Further, $SnO_2$ is relatively inexpensive, and $SnO_2$ particles having a particle diameter as described later can be easily and stably obtained.

The number-based average particle diameter of the conductive transparent metal oxide particles P22 is not particularly limited, but is preferably 0.8 nm or more and 5.0 nm or less, more preferably 1.0 nm or more and 3.0 nm or less, further more preferably 1.3 nm or more and 2.7 nm or less.

According to this, the antistatic function can be made particularly excellent while making the transparency of the film P2 particularly excellent. Further, the film P2 can be made relatively dense, and the strength of the film P2 and the durability of the optical component P10 can be made particularly excellent.

When the number-based average particle diameter of the silica particles P21 is represented by Ds (nm) and the number-based average particle diameter of the conductive transparent metal oxide particles P22 is represented by Dc (nm), it is preferred to satisfy the following relationship: $0.1 \leq Dc/Ds \leq 0.6$, it is more preferred to satisfy the following relationship: $0.2 \leq Dc/Ds \leq 0.5$, and it is further more preferred to satisfy the following relationship: $0.3 \leq Dc/Ds \leq 0.4$.

By satisfying such a relationship, a mixing state of the silica particles P21 and the conductive transparent metal oxide particles P22 in the film P2 can be made more favorable, and the antistatic function of the optical component P10 can be made particularly excellent. Further, the film P2 can be made relatively dense, and the strength of the film P2 and the durability of the optical component P10 can be made particularly excellent. In addition, the antireflection function and the like of the film P2 can also be made particularly excellent.

The content of the conductive transparent metal oxide particles P22 in the film P2 (the content thereof to the total solid components) is preferably 0.5% by volume or more and 10% by volume or less, more preferably 1.0% by volume or more and 8.0% by volume or less.

According to this, the antistatic function can be made particularly excellent while making the antireflection function and the like of the film P2 excellent.

When the content of the silica particles P21 in the film P2 (the content thereof to the total solid components) is represented by Xs (vol %) and the content of the conductive transparent metal oxide particles P22 in the film P2 (the content thereof to the total solid components) is represented by Xc (vol %), it is preferred to satisfy the following relationship: $0.003 \leq Xc/Xs \leq 0.12$, and it is more preferred to satisfy the following relationship: $0.005 \leq Xc/Xs \leq 0.1$.

According to this, the antistatic function can be made particularly excellent while making the antireflection function and the like of the film P2 excellent. Further, the film P2 can be made relatively dense, and the strength of the film P2 and the durability of the optical component P10 can be made particularly excellent. Further, the transparency of the film P2 can be made particularly excellent.

Another Component

The film P2 may contain a component other than the above-mentioned components.

Examples of such a component include an antifungal agent, a preservative, an antioxidant, an ultraviolet absorber, a binder, and a slipping agent (leveling agent).

The porosity of the film P2 is preferably 15% by volume or more and 36% by volume or less, more preferably 18% by volume or more and 32% by volume or less.

According to this, while making the durability of the optical component P10 as a whole sufficiently excellent, the refractive index of the film P2 as a whole can be more easily adjusted so as to fall within a preferred range, and the antireflection function can be made particularly excellent. Further, the antistatic function attributed to the film P2 can be made particularly excellent.

The porosity of the film P2 refers to the ratio of pores accounting for the entire volume of the film P2, and the pore encompasses not only a space provided among particles constituting the film P2, but also a hole provided inside the particle.

The surface roughness Ra of the film P2 is preferably 0.5 nm or more and 10.0 nm or less, more preferably 0.7 nm or more and 6.0 nm or less.

According to this, the antifogging property of the optical component P10 can be made particularly excellent while making the light transmittance of the optical component P10 as a whole sufficiently excellent.

The thickness of the film P2 is preferably 50 nm or more and 120 nm or less, more preferably 60 nm or more and 100 nm or less.

According to this, the durability, antistatic function, and the like of the optical component P10 can be made particularly excellent while effectively preventing the optical property of the optical component P10 from being adversely affected.

Examples of the optical component include various lenses (including microlenses, lenticular lenses, fresnel lenses, and the like) such as projector lenses, camera lenses, and eyeglass lenses, filters (camera low-pass filters, and the like), light transmitting plates, dust-proof glasses, radiator plates, cover glasses for timepieces, rear lids for timepieces, and light transmitting dial plates (for example, dial plates for solar timepieces).

Among these, the optical component is preferably a cover glass for a timepiece.

Time-displaying members such as a dial plate and hands are generally disposed on a rear surface side of the cover glass, and therefore, the cover glass (optical component) is a member which is strongly required to have visibility of a dial plate and the like through the cover glass (optical component). Therefore, the cover glass is a member in which a problem of decreasing the visibility particularly remarkably occurs when dirt such as dust adheres to the cover glass due to static electricity. Further, in the case where the cover glass is undesirably charged with electricity, due to the effect, the hands such as an hour hand may be deformed, and therefore, a breakdown or the like of the timepiece may be caused due to such deformation. On the other hand, in the case where the invention is applied to a cover glass for a timepiece, the occurrence of the problem as described above can be effectively prevented. Therefore, by applying the invention to a cover glass for a timepiece, the effect of the invention is more remarkably exhibited.

Further, in the optical component according to the invention, an excellent antireflection function is also exhibited, and therefore, the visibility of the time-displaying members such as a dial plate and hands disposed on the rear surface side of the cover glass can be made particularly excellent.

In the case of a diver's watch or the like, the visibility through the cover glass sometimes largely affects the safety of an observer (user), however, according to the invention, an antireflection function is also exhibited, and therefore, also in an optical component for a timepiece to be used in such a severe environment, the effect as described above can be reliably exhibited.

Further, in a diver's watch or the like, liquid tightness in a case is maintained, however, a humidity contained in the case when assembling the watch is dew-condensed during use to cause a problem of decreasing the visibility in some cases. However, according to the invention, the optical component also has a high antifogging property, and therefore, for example, in a diver's watch, by disposing a cover glass (optical component), to which the invention is applied, such that a surface provided with the film faces the inner surface side, the problem of dew condensation as described above can be more reliably prevented.

Second Embodiment

Figure 3:
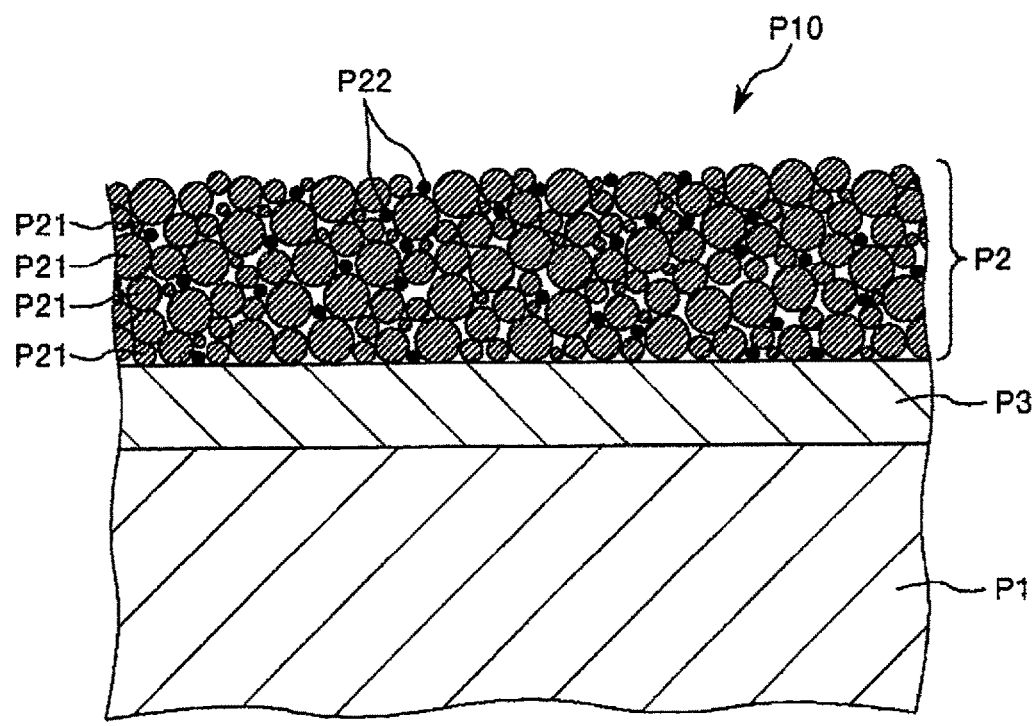
FIG. 3 is a cross-sectional view schematically showing a second embodiment of an optical component according to the invention.

FIG. 3 is a cross-sectional view schematically showing a second embodiment of the optical component according to the invention. In the following description, different points from the above embodiment will be mainly described, and the description of the same matter will be omitted.

As shown in FIG. 3, an optical component P10 of this embodiment includes a base material P1, a film P2 containing silica particles P21 and conductive transparent metal oxide particles P22, and a foundation layer P3.

In this manner, by including the foundation layer P3, for example, the adhesiveness between the base material P1 and the film P2 (the adhesiveness through the foundation layer P3) can be made particularly excellent, and thus, the durability and reliability of the optical component P10 can be made particularly excellent.

Examples of a constituent material of the foundation layer P3 include various resin materials and $SiO_2$.

The thickness of the foundation layer P3 is not particularly limited, but is preferably 5 nm or more and 25 nm or less, more preferably 10 nm or more and 20 nm or less.

In the configuration shown in the drawing, only one foundation layer P3 is formed, however, the optical component P10 may include a plurality of foundation layers between the base material P1 and the film P2.

Method for Producing Optical Component

Next, a method for producing the optical component will be described.

The optical component P10 may be produced by any method, but can be favorably produced by, for example, using a method including a base material preparation step (1a) of preparing a base material P1, a film forming composition application step (1b) of applying a film forming composition containing silica particles P21, conductive transparent metal oxide particles P22, and a dispersion medium onto the base material P1, and a dispersion medium removal step (1c) of removing the dispersion medium from the film forming composition applied onto the base material P1.

Base Material Preparation Step

In this step, a base material P1 is prepared (1a).

As the base material P1, a material described above can be used, however, a material subjected to a pretreatment such as a washing treatment or a lyophilization treatment may be used. Further, as the pretreatment, a mask may be formed in a region where the film P2 is not desired to be formed. In this case, as a post-treatment step, a mask removal step may be included.

Film Forming Composition Application Step

In this step, a film forming composition containing silica particles P21, conductive transparent metal oxide particles P22, and a dispersion medium for dispersing these particles is applied onto the base material P1 (1b).

Such a film forming composition contains a dispersion medium and has excellent fluidity, and therefore, the film P2 in which an undesirable variation in the thickness is more effectively prevented can be easily and reliably formed.

Examples of the method for applying the film forming composition onto the base material P1 include various printing methods such as an inkjet method, various coating methods such as roll coating, spray coating, spin coating, and brush coating, and dipping (a dipping method).

The dispersion medium constituting the film forming composition may be any as long as it has a function to disperse the silica particles P21 and the conductive transparent metal oxide particles P22, however, examples thereof include water; alcohol-based solvents such as methanol, ethanol, isopropanol, ethylene glycol, propylene glycol, and glycerin; ketone-based solvents such as methyl ethyl ketone and acetone; glycol ether-based solvents such as ethylene glycol monoethyl ether and ethylene glycol monobutyl ether; glycol ether acetate-based solvents such as propylene glycol 1-monomethyl ether 2-acetate and propylene glycol 1-monoethyl ether 2-acetate; polyethylene glycol and polypropylene glycol, and one type or a combination of two or more types selected from these solvents can be used.

Among these, as the dispersion medium, water, an alcohol-based solvent, or a glycol-based solvent (in addition to a glycol such as ethylene glycol or propylene glycol, a compound such as an ether, an ester, or the like of a glycol such as a glycol ether-based solvent or a glycol ether acetate-based solvent) is preferred.

According to this, the dispersion stability of the silica particles P21 and the conductive transparent metal oxide particles P22 in the film forming composition can be made particularly excellent, and the occurrence of an undesirable variation in the composition in the film P2 to be formed and an undesirable variation in the thickness thereof can be more effectively prevented.

In particular, in the case where the film forming composition is applied by a method such as roll coating or spin coating, it is preferred to use water or an alcohol-based solvent as the dispersion medium.

According to this, the coatability of the film forming composition on the base material P1 can be made particularly excellent.

In the case where the film forming composition is applied by a method such as spray coating, it is preferred to use a glycol-based solvent as the dispersion medium.

According to this, the coatability of the film forming composition onto the base material P1 can be made particularly excellent. Further, clogging can be prevented, and thus, the productivity and the like of the optical component P10 can be made particularly high.

The film forming composition may contain a component (another component) other than the silica particles P21, the conductive transparent metal oxide particles P22, and the dispersion medium. Examples of such a component (another component) include an antifungal agent, a preservative, an antioxidant, an ultraviolet absorber, a binder, and a slipping agent (leveling agent).

The content of the silica particles P21 in the film forming composition is not particularly limited, but is preferably 0.5% by mass or more and 10% by mass or less.

According to this, the fluidity of the film forming composition can be made favorable, and the occurrence of an undesirable variation in the thickness or the like in the film P2 to be formed can be more effectively prevented, and also the efficiency of forming the film P2 can be made particularly excellent, and thus, the productivity of the optical component P10 can be made particularly high.

The content of the conductive transparent metal oxide particles P22 in the film forming composition is not particularly limited, but is preferably 0.02% by mass or more and 0.5% by mass or less.

According to this, the fluidity of the film forming composition can be made favorable, and the occurrence of an undesirable variation in the thickness or the like in the film P2 to be formed can be more effectively prevented, and also the efficiency of forming the film P2 can be made particularly excellent, and thus, the productivity of the optical component P10 can be made particularly high.

The content of the dispersion medium in the film forming composition is not particularly limited, but is preferably 90% by mass or more and 99.5% by mass or less.

According to this, the fluidity of the film forming composition can be made favorable, and the occurrence of an undesirable variation in the thickness or the like in the film P2 to be formed can be more effectively prevented, and also the efficiency of forming the film P2 can be made particularly excellent, and thus, the productivity of the optical component P10 can be made particularly high.

The viscosity of the film forming composition in this step as measured according to JIS Z 8809 using a vibration-type viscometer is preferably 20 mPa·s or less, more preferably 3 mPa·s or more and 15 mPa·s or less.

According to this, the application of the film forming composition onto the base material P1 can be favorably performed, and the occurrence of an undesirable variation in the thickness or the like in the film P2 to be formed can be more effectively prevented, and also the efficiency of forming the film P2 can be made particularly excellent, and thus, the productivity of the optical component P10 can be made particularly high.

Dispersion Medium Removal Step

In this step, the dispersion medium is removed from the film forming composition applied onto the base material P1 (1c).

According to this, the film P2 strongly bonded to the base material P1 is formed. In particular, the film forming composition contains particles (silica particles P21 and conductive transparent metal oxide particles P22) as constituent components of the film P2.

Due to this, when the dispersion medium is removed in this step, the occurrence of a phenomenon that the dispersion medium is undesirably enclosed in the film P2 to be formed so that the dispersion medium undesirably remains in the optical component P10 to be finally obtained can be reliably prevented. As a result, the optical property and reliability of the optical component P10 can be reliably made excellent. Further, since the film forming composition contains particles (silica particles P21 and conductive transparent metal oxide particles P22) as constituent components of the film P2, the dispersion medium contained in the film forming composition in the form of a film can be maintained in a state where it communicates with the outside constantly in this step, and therefore, the dispersion medium can be efficiently removed from the film forming composition in the form of a film. As a result, the productivity of the optical component P10 can be made high.

This step can be performed by, for example, a heating treatment, a vacuum treatment, an air blowing treatment, or the like, and two or more treatments selected therefrom may be performed in combination.

In the case where this step is performed by a heating treatment, the heating temperature is preferably 50° C. or higher and 200° C. or lower, more preferably 60° C. or higher and 180° C. or lower. Further, the heating temperature in this step is preferably lower than the boiling point of the dispersion medium of the film forming composition.

According to this, the film P2 can be efficiently formed while preventing undesirable deterioration, denaturation, or the like of the material, or undesirable deformation or the like of the film P2 or the like.

In the case where this step is performed by a vacuum treatment, the pressure during the vacuum treatment (the pressure of the environment in which the base material P1 having the film forming composition applied thereon is placed) is preferably $1 \times 10^2$ Pa or less, more preferably $1 \times 10^1$ Pa or less.

According to this, the productivity of the optical component P10 can be made particularly high. Further, the occurrence of an adverse effect caused by the dispersion medium remaining in the finally obtained optical component P10 can be more reliably prevented.

In this step, for example, two or more treatments under different conditions may be performed.

For example, a first heating treatment which is performed at a relatively low temperature and a second heating treatment which is performed at a higher temperature than in the first heating treatment may be performed. According to this, while more effectively preventing the occurrence of a defect (for example, the occurrence of a relatively large pore, undesirable deformation of the film P2, or the like) or the like in the film P2 to be formed, the efficiency of forming the film P2 can be made particularly excellent.

The film forming composition application step and the dispersion medium removal step may be performed repeatedly. According to this, even a film having a relatively large thickness can be favorable formed. In addition, the film P2 can be favorably formed at a plurality of places on the base material P1. For example, even in the case where the film P2 is formed at a plurality of places where it is difficult to apply the film forming composition by performing a single film forming composition application step, or in the case where the films P2 having a different condition, for example, having a different thickness are formed, etc., this production method can be favorably applied.

Further, as shown in FIG. 3, in the case where the optical component P10 having the foundation layer P3 between the base material P1 and the film P2 is produced, for example, by providing a foundation layer forming material application step of applying a foundation layer forming material onto the base material P1 prior to the film forming composition application step, the optical component P10 can be favorably produced.

In the case where the foundation layer P3 containing a resin material is formed, as the foundation layer forming material, a material obtained by dissolving the resin material in a solvent, a liquid composition containing a precursor (for example, a monomer, a dimer, a trimer, an oligomer, a prepolymer, or the like) of the resin material can be used.

In the case where such a material is used, examples of the method for applying the foundation layer forming material include various printing methods such as an inkjet method, various coating methods such as roll coating, spray coating, spin coating, and brush coating, and dipping (a dipping method).

Further, in the case where the foundation layer P3 composed of, for example, $SiO_2$ is formed, a foundation layer formation step of forming the foundation layer P3 on the surface of the base material P1 by a gas-phase deposition method (for example, a vapor deposition method) may be provided prior to the film forming composition application step. According to this, the adhesiveness between the base material P1 and the foundation layer P3 can be made particularly excellent, and also the transparency of the foundation layer P3 can be made particularly high, and thus, the optical property of the optical component P10 as a whole can be further enhanced.

According to the production method as described above, an optical component having an excellent antistatic function while having sufficient light transmittance can be efficiently produced.

Timepiece

Next, a timepiece according to the invention will be described.

The timepiece according to the invention includes the optical component according to the invention as described above.

According to this, a timepiece including the optical component having an excellent antistatic function while having sufficient light transmittance can be provided, and for example, a timepiece in which the occurrence of an adverse effect of static electricity is effectively prevented can be provided, and thus, the reliability of the timepiece as a whole can be made high. Further, a timepiece capable of favorably visually recognizing a state on a rear surface side of the optical component can be provided, and the aesthetic appearance (aestheticity) of the timepiece as a whole can be made excellent, and thus, the value as an ornament can be increased. In addition, for example, the visibility of the time and the like can be improved, and therefore, also the function (practicality) as a utility article becomes excellent.

The timepiece according to the invention may be any as long as it includes the optical component according to the invention as at least one optical component, and as the other components, known components can be used, however, hereinafter, one example of the configuration of the timepiece when the optical component according to the invention is applied to the cover glass will be representatively described.

Figure 4:
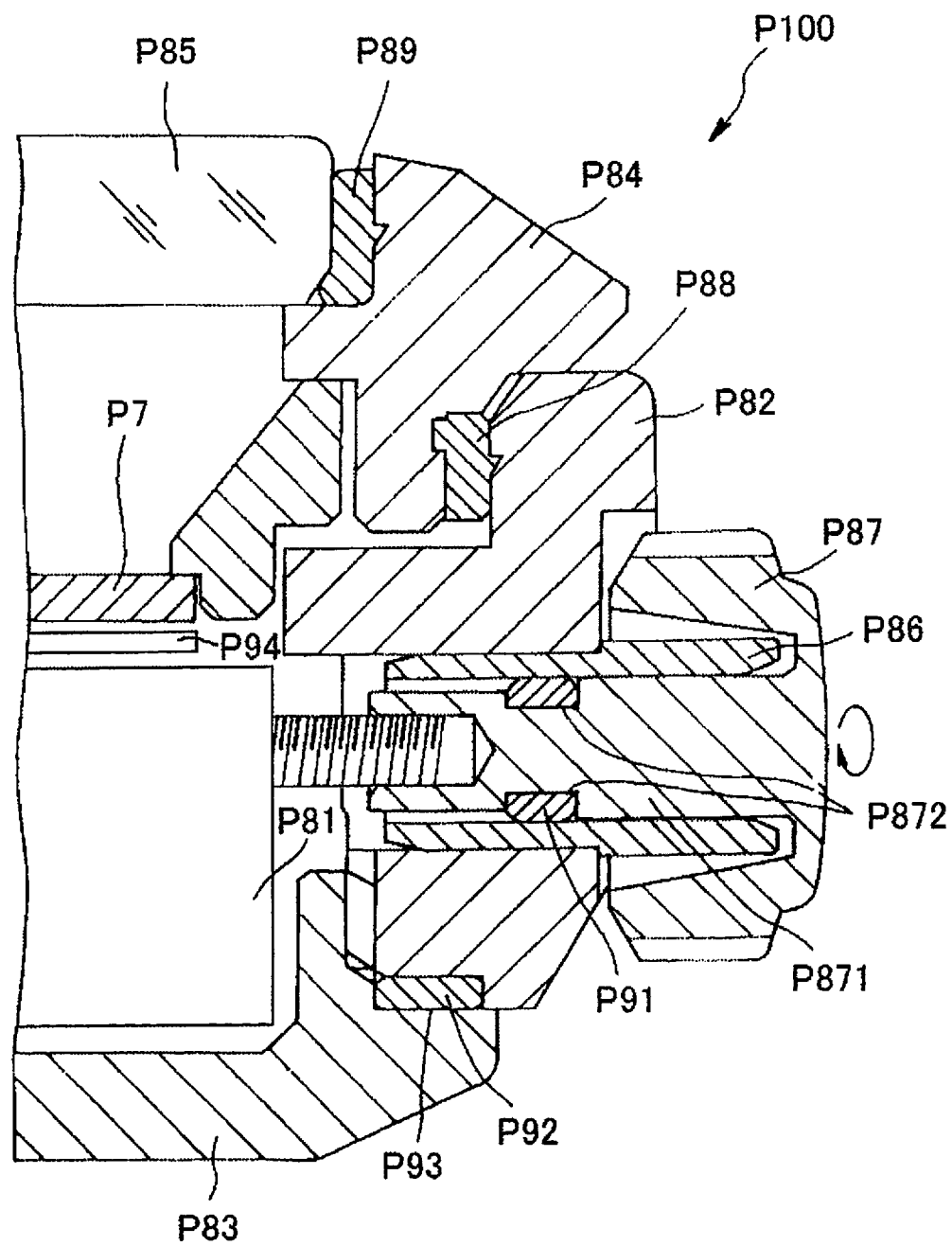
FIG. 4 is a partial cross-sectional view showing a preferred embodiment of a timepiece (wristwatch) according to the invention.

FIG. 4 is a partial cross-sectional view showing a preferred embodiment of the timepiece (wristwatch) according to the invention.

As shown in FIG. 4, a wristwatch (portable timepiece) P100 of this embodiment includes a barrel (case) P82, a rear lid P83, a bezel (frame) P84, and a cover glass (a cover glass for a timepiece) P85. In the case P82, a dial plate for a timepiece (a dial plate) P7, a solar cell P94, and a movement P81 are housed, and further, hands (indicator hands) not shown in the drawing and the like are also housed.

The cover glass P85 is composed of the optical component according to the invention as described above.

According to this, the visibility of the dial plate P7, the hands (indicator hands), and the like can be enhanced. Further, the dial plate P7 and the like are members which have a large influence on the appearance of the entire timepiece, however, undesirable light reflection when the dial plate P7 and the like are visually recognized is prevented, and therefore, the aesthetic appearance (aestheticity) of the timepiece as a whole can be made particularly excellent.

The movement P81 drives the indicator hands by utilizing the electromotive force of the solar cell P94.

Although not shown in FIG. 4, in the movement P81, for example, an electric double-layer capacitor which stores the electromotive force of the solar cell P94, a lithium ion secondary buttery, a crystal oscillator as a time reference source, a semiconductor integrated circuit which generates a driving pulse for driving the timepiece based on the oscillation frequency of the crystal oscillator, a step motor for driving the indicator hands every second by receiving this driving pulse, a gear train mechanism for transmitting the movement of the step motor to the indicator hands, and the like are included.

Further, the movement P81 includes an antenna for receiving a radio wave (not shown), and has a function to perform time adjustment and the like using the received radio wave.

The solar cell P94 has a function to convert light energy into electrical energy. The electrical energy converted by the solar cell P94 is utilized for driving the movement P81 or the like.

The solar cell P94 has, for example, a PIN structure in which a p-type impurity and an n-type impurity are selectively introduced into a non-single crystal silicon thin film, and further, an i-type non-single crystal silicon thin film having a low impurity concentration is provided between a p-type non-single crystal silicon thin film and an n-type non-single crystal silicon thin film.

In the barrel P82, a winding stem pipe P86 is fitted and fixed, and in this winding stem pipe P86, a shaft P871 of a stem P87 is rotatably inserted.

The barrel P82 and the bezel P84 are fixed to each other with a plastic packing P88, and the bezel P84 and the cover glass P85 are fixed to each other with a plastic packing P89.

In the barrel P82, the rear lid P83 is fitted (or threadedly engaged), and in a joint portion (seal portion) P93 of these members, a ring-shaped rubber packing (rear lid packing) P92 is inserted in a compressed state. According to this configuration, the seal portion P93 is sealed in a liquid-tight manner, whereby a water-proof function is obtained.

A groove P872 is formed in a middle part on an outer periphery of the shaft P871 of the stem P87, and in this groove P872, a ring-shaped rubber packing (stem packing) P91 is fitted. The rubber packing P91 is in close contact with the inner peripheral surface of the winding stem pipe P86 and compressed between the inner peripheral surface and the inner surface of the groove P872. According to this configuration, liquid-tight sealing is provided between the stem P87 and the winding stem pipe P86, so that a water-proof function is obtained. Incidentally, when the stem P87 is rotated, the rubber packing P91 rotates along with the shaft P871 and slides in the circumferential direction while being in close contact with the inner peripheral surface of the winding stem pipe P86.

In the above description, as one example of the timepiece, a timepiece including a cover glass as the optical component according to the invention has been described, however, the timepiece according to the invention may be a timepiece including, for example, a component to which the optical component according to the invention is applied as the component other than the cover glass. For example, the rear lid or the like may be one composed of the optical component according to the invention. According to this, for example, the optical component according to the invention is applied to a member closer to the movement, and therefore, the movement can be more effectively prevented from being electrically adversely affected, and thus, the reliability of the timepiece as a whole can be made particularly high. Further, the aesthetic appearance (aestheticity) of the timepiece as a whole can be improved.

Further, in the above description, as one example of the timepiece, a wristwatch (portable timepiece) as a solar radio timepiece has been described, however, the invention can also be applied to other types of timepieces such as portable timepieces other than wristwatches, table clocks, and wall clocks in the same manner. Further, the invention can also be applied to any timepieces such as solar timepieces other than solar radio timepieces and radio timepieces other than solar radio timepieces.

Hereinabove, preferred embodiments of the invention have been described, however, the invention is not limited to those described above.

For example, in the optical component and the timepiece according to the invention, the configuration of each part can be replaced with an arbitrary configuration exhibiting a similar function, and also an arbitrary configuration can be added.

For example, the optical component may include a protective film or the like in addition to the base material and the film (the film containing the silica particles and the conductive transparent metal oxide particles).

Further, the optical component according to the invention may include a plurality of films described above. For example, in the above-mentioned embodiment, a case where the film is provided on one surface side of the base material has been described, however, the film may be provided on both surface sides of the base material. Further, the optical component may have a configuration in which a plurality of films described above are stacked on one another through an intermediate layer.

Further, in the above-mentioned embodiment, a case where the optical component according to the invention is used as a constituent component of a timepiece has been mainly described, however, the optical component according to the invention is not limited to an optical component to be used as a constituent component of a timepiece, and may be an optical component to be applied to, for example, various electrical devices including optical devices such as cameras (including video cameras, cameras mounted on cellular phones (including smart phones, PHS, etc.), and the like) and projectors, optical measurement devices such as microscopes, and the like, and also to eyeglasses, loupes, and the like. Further, the optical component according to the invention is not limited to an optical component to be used in combination with another member, and may be an optical component to be used by itself alone.

Further, in the production of the optical component according to the invention, other than the above-mentioned steps, according to need, a pretreatment step, an intermediate treatment step, and a post-treatment step may be performed. For example, prior to the film forming composition application step, a step of performing UV irradiation, plasma irradiation, or the like on the surface of the base material may be included. According to this, for example, the wettability of the film forming composition on the base material can be made more favorable, and the film having a desired condition (for example, a desired film thickness) can be more favorably formed. Further, the adhesiveness between the base material and the film is made particularly excellent, and thus, the durability and reliability of the optical component can be made particularly excellent.

Further, the optical component according to the invention is not limited to those produced using the above-mentioned method. For example, in the above-mentioned embodiment, a case where the film is formed by using a film forming composition containing a dispersion medium in addition to silica particles and conductive transparent metal oxide particles has been described, however, for example, as the film forming composition, a composition containing no dispersion medium may be used. Further, the film may be formed by, for example, mixing a composition containing silica particles and a composition containing conductive transparent metal oxide particles on a base material.

EXAMPLES

Next, specific examples of the invention will be described.

1. Production of Optical Component (Cover Glass)

Example 1

By the method as described below, a cover glass as an optical component was produced.

First, a plate material (glass plate) composed of a sapphire glass was prepared as a base material (the base material preparation step), and a necessary part was cut and polished. The base material obtained by cutting and polishing had a substantially disk shape and had a size of 30 mm in diameter and 1 mm in thickness.

Subsequently, a UV irradiation treatment in which an ultraviolet ray with a wavelength of 248 nm was irradiated on the surface of the base material on the side where a film was going to be formed.

Subsequently, a film forming composition was applied onto the entire surface of one side of the base material by a spray coating method (film forming composition application step).

As the film forming composition, a composition obtained by mixing silica particles, tin oxide ($SnO_2$) particles (number-based average particle diameter: 2.0 nm) as conductive transparent metal oxide particles, and methanol as a dispersion medium at a given ratio was used.

As the silica particles, silica particles which have a first local maximum in the range of 1.5 nm or more and 2.5 nm or less (a first range), a second local maximum in the range of 3.5 nm or more and 4.5 nm or less (a second range), and a third local maximum in the range of 7.5 nm or more and 8.5 nm or less (a third range), and a fourth local maximum in the range of 5.5 nm or more and 6.5 nm or less (a fourth range) in a number-based particle size distribution, and also have a number-based average particle diameter of 2.6 nm were used.

Thereafter, the base material onto which the film forming composition was applied was left to stand in an environment at $1\times10^{-4}$ Pa to remove the dispersion medium constituting the film forming composition (dispersion medium removal step), whereby the film was formed.

The average thickness of the formed film was 80 nm and the porosity was 26% by volume. Further, the surface roughness Ra of the outer surface (the surface on an opposite side to the surface facing the base material) of the film was 1.3 nm.

Examples 2 to 6

Optical components (cover glasses) were produced in the same manner as in the above Example 1 except that the particle size distribution of the silica particles constituting the film forming composition was changed as shown in Table 1, and the configuration of the film forming composition and the configurations of the respective parts of the optical component were changed as shown in Table 2.

Example 7

An optical component (cover glass) was produced in the same manner as in the above Example 1 except that prior to the film forming composition application step, a foundation layer composed of $SiO_2$ was formed on the surface of the base material (the surface on the side where the film was going to be formed) (the foundation layer formation step).

The formation of the foundation layer was performed by vacuum vapor deposition. The thickness of the formed foundation layer was 15 nm.

Examples 8 and 9

Optical components (cover glasses) were produced in the same manner as in the above Example 7 except that the particle size distribution of the silica particles constituting the film forming composition was changed as shown in Table 1, and the configuration of the film forming composition and the configurations of the respective parts of the optical component were changed as shown in Table 2.

Comparative Example 1

An optical component (cover glass) was produced in the same manner as in the above Example 2 except that the base material (the plate material composed of a sapphire glass) was directly used as the optical component without forming a film on the base material.

Comparative Example 2

First, a plate material (glass plate) composed of a sapphire glass was prepared as a base material (the base material preparation step), and a necessary part was cut and polished. The base material obtained by cutting and polishing had a substantially disk shape and had a size of 30 mm in diameter and 1 mm in thickness.

Subsequently, a UV irradiation treatment in which an ultraviolet ray with a wavelength of 248 nm was irradiated on the surface of the base material on the side where a film was going to be formed.

Thereafter, by using silicon as a target, sputtering was performed under the following conditions, whereby a film composed of a high-refractive index layer and a low-refractive index layer was formed on one surface of the base material, whereby an optical component (cover glass) was produced. The specific stacking configuration of the film was as follows in the order from the side closer to the base material: $SiO_2$ (9 nm)/$SiN_x$ (37 nm)/$SiO_2$ (29 nm)/$SiN_x$ (26 nm)/$SiO_2$ (53 nm)/$SiN_x$ (22 nm)/$SiO_2$ (26 nm)/$SiN_x$ (107 nm)/$SiO_2$ (81 nm).

Conditions for Formation of High-Refractive Index Layer: Silicon Nitride ($SiN_x$)
  $N_2$ gas flow rate: 10.0 sccm
  Ar gas flow rate: 10.0 sccm
  Sputtering power: 2.0 kW Conditions for Formation of Low-Refractive Index Layer: Silicon Oxide ($SiO_2$)
  $O_2$ gas flow rate: 10.0 sccm
  Ar gas flow rate: 10.0 sccm
  Sputtering power: 1.5 kW The volume fraction of silicon nitride ($SiN_x$) from the outermost surface of the film to the depth of 150 nm was 46%.

Comparative Example 3

An optical component (cover glass) was produced in the same manner as in the above Example 2 except that as the film forming composition, a composition containing no conductive transparent metal oxide particles was used.

Comparative Example 4

An optical component (cover glass) was produced in the same manner as in the above Example 2 except that as the film forming composition, a composition containing no silica particles was used.

Comparative Example 5

An optical component (cover glass) was produced in the same manner as in the above Example 2 except that an anionic surfactant was used as the film forming composition and the film was formed as a film composed of a polymeric organic material.

The particle size distributions of the silica particles constituting the film forming compositions used in the production of the optical components (cover glasses) of the respective Examples and Comparative Examples are shown in Table 1, and the configurations of the film forming compositions used in the production of the optical components (cover glasses) of the respective Examples and Comparative Examples and the configurations of the respective parts of the optical components (cover glasses) of the respective Examples and Comparative Examples are shown in Table 2. Incidentally, in Tables 1 and 2, in the column of "average particle diameter", the value of the number-based average particle diameter is shown. Further, in the above respective Examples and Comparative Examples, the particle size distribution of the particles was determined by laser diffractometry using a single nanoparticle size analyzer IG-1000 (manufactured by Shimadzu Corporation). Further, the viscosities (viscosities in the film forming composition application step) of the film forming compositions used in the above respective Examples and Comparative Examples as measured according to JIS Z 8809 using a vibration-type viscometer were all in the range of 3 mPa·s or more and 15 mPa·s or less.

TABLE 1

| | | First range | | | Second range | | |
|---|---|---|---|---|---|---|---|
| | Presence or absence of first local maximum | Particle diameter of first local maximum (nm) | Ratio of silica particles falling within first range (vol %) | Presence or absence of second local maximum | Particle diameter of second local maximum (nm) | Ratio of silica particles falling within second range (vol %) | Third range Presence or absence of third local maximum |
| Example 1 | presence | 2.0 | 15 | presence | 4.0 | 20 | presence |
| Example 2 | absence | — | — | presence | 4.0 | 50 | presence |
| Example 3 | presence | 2.0 | 15 | presence | 4.0 | 20 | presence |
| Example 4 | presence | 2.0 | 15 | presence | 4.0 | 20 | presence |
| Example 5 | presence | 2.0 | 15 | presence | 4.0 | 20 | presence |
| Example 6 | presence | 2.0 | 15 | presence | 4.0 | 20 | presence |
| Example 7 | presence | 2.0 | 15 | presence | 4.0 | 20 | presence |

TABLE 1-continued

| | | | | | | | |
|---|---|---|---|---|---|---|---|
| Example 8 | presence | 2.0 | 15 | presence | 4.0 | 20 | presence |
| Example 9 | presence | 2.0 | 15 | presence | 4.0 | 20 | presence |
| Comparative Example 1 | — | — | — | — | — | — | — |
| Comparative Example 2 | — | — | — | — | — | — | — |
| Comparative Example 3 | absence | — | — | presence | 4.0 | 40 | presence |
| Comparative Example 4 | — | — | — | — | — | — | — |
| Comparative Example 5 | — | — | — | — | — | — | — |

| | Third range | | Fourth range | | | |
|---|---|---|---|---|---|---|
| | Particle diameter of third local maximum (nm) | Ratio of silica particles falling within third range (vol %) | Presence or absence of fourth local maximum | Particle diameter of fourth local maximum (nm) | Ratio of silica particles falling within fourth range (vol %) | Average particle diameter (nm) |
| Example 1 | 8.0 | 40 | presence | 6.0 | 25 | 2.6 |
| Example 2 | 8.0 | 50 | absence | — | — | 4.3 |
| Example 3 | 8.0 | 40 | presence | 6.0 | 25 | 2.6 |
| Example 4 | 8.0 | 40 | presence | 6.0 | 25 | 2.6 |
| Example 5 | 8.0 | 40 | presence | 6.0 | 25 | 2.6 |
| Example 6 | 8.0 | 40 | presence | 6.0 | 25 | 2.6 |
| Example 7 | 8.0 | 40 | presence | 6.0 | 25 | 2.6 |
| Example 8 | 8.0 | 40 | presence | 6.0 | 25 | 2.6 |
| Example 9 | 8.0 | 40 | presence | 6.0 | 25 | 2.6 |
| Comparative Example 1 | — | — | — | — | — | — |
| Comparative Example 2 | — | — | — | — | — | — |
| Comparative Example 3 | 8.0 | 60 | absence | — | — | 4.6 |
| Comparative Example 4 | — | — | — | — | — | — |
| Comparative Example 5 | — | — | — | — | — | — |

TABLE 2

| | Configuration of film forming composition | | | | | | Configuration of optical component | | | | | |
|---|---|---|---|---|---|---|---|---|---|---|---|---|
| | Silica particles | Conductive transparent metal oxide particles | | | Dispersion medium | | Base material | Foundation layer | | Film | | | |
| | Content (mass %) | Constituent material | Average particle diameter (nm) | Content (mass %) | Constituent material | Content (mass %) | Constituent material | Constituent material | Thickness (nm) | Constituent material | Content (vol %)/Thickness (nm) | Surface roughness Ra (nm) | Porosity (vol %) |
| Example 1 | 2.0 | SnO$_2$ | 2.0 | 0.1 | methanol | 97.9 | Sapphire glass | — | — | SiO$_2$ particles/SnO$_2$ particles | 98.4/1.6 | 80 | 1.3 | 26 |
| Example 2 | 2.0 | SnO$_2$ | 2.0 | 0.1 | methanol | 97.9 | Sapphire glass | — | — | SiO$_2$ particles/SnO$_2$ particles | 98.4/1.6 | 80 | 2.1 | 35 |
| Example 3 | 2.0 | SnO$_2$ | 2.0 | 0.04 | methanol | 97.96 | Sapphire glass | — | — | SiO$_2$ particles/SnO$_2$ particles | 99.7/0.3 | 80 | 1.3 | 26 |
| Example 4 | 2.0 | SnO$_2$ | 2.0 | 0.5 | methanol | 97.5 | Sapphire glass | — | — | SiO$_2$ particles/SnO$_2$ particles | 92.6/7.4 | 80 | 1.3 | 25 |
| Example 5 | 2.0 | SnO$_2$ | 1.0 | 0.1 | methanol | 97.9 | Sapphire glass | — | — | SiO$_2$ particles/SnO$_2$ particles | 98.4/1.6 | 80 | 1.2 | 25 |
| Example 6 | 2.0 | SnO$_2$ | 5.0 | 0.1 | methanol | 97.9 | Sapphire glass | — | — | SiO$_2$ particles/SnO$_2$ particles | 98.4/1.6 | 80 | 1.4 | 28 |

TABLE 2-continued

| | Configuration of film forming composition | | | | | | Configuration of optical component | | | | | | |
|---|---|---|---|---|---|---|---|---|---|---|---|---|---|
| | Silica particles | Conductive transparent metal oxide particles | | | Dispersion medium | | Base material | Foundation layer | | Film | | | |
| | Content (mass %) | Constituent material | Average particle diameter (nm) | Content (mass %) | Constituent material | Content (mass %) | Constituent material | Constituent material | Thickness (nm) | Constituent material | Content (vol %) | Thickness (nm) | Surface roughness Ra (nm) | Porosity (vol %) |
| Example 7 | 2.0 | SnO$_2$ | 2.0 | 0.1 | methanol | 97.9 | Sapphire glass | SiO$_2$ | 15 | SiO$_2$ particles/ SnO$_2$ particles | 98.4/ 1.6 | 80 | 1.3 | 26 |
| Example 8 | 2.0 | SnO$_2$ | 2.0 | 0.1 | methanol | 97.9 | Sapphire glass | SiO$_2$ | 5 | SiO$_2$ particles/ SnO$_2$ particles | 99.5/ 0.5 | 80 | 1.3 | 26 |
| Example 9 | 2.0 | SnO$_2$ | 2.0 | 0.1 | methanol | 97.9 | Sapphire glass | SiO$_2$ | 25 | SiO$_2$ particles/ SnO$_2$ particles | 99.5/ 0.5 | 80 | 1.1 | 26 |
| Comparative Example 2 | — | — | — | — | — | — | Sapphire glass | — | — | SiO$_2$ layer/ SiN$_x$ layer | — | 390 | 0.6 | 0 |
| Comparative Example 3 | 2.0 | — | — | — | methanol | 98.0 | Sapphire glass | — | — | SiO$_2$ particles | 100 | 80 | 1.0 | 14 |
| Comparative Example 4 | — | SnO$_2$ | 2.0 | 2.0 | methanol | 98.0 | Sapphire glass | — | — | SnO$_2$ particles | 100 | 80 | 1.0 | 14 |
| Comparative Example 5 | — | — | — | — | — | — | Sapphire glass | — | — | Anionic surfactant | 100 | 10 | 0.5 | — |

2. Evaluation of Antistatic Property

A probe was brought into contact with the surface on the side where the film was provided of each of the cover glasses produced in the above respective Examples and Comparative Examples, and the surface electrical resistance was measured by using a surface resistance meter (Hiresta-UP MCP-HT45 manufactured by Mitsubishi Chemical Corporation), and evaluation was performed according to the following criteria. It can be said that as the surface electrical resistance is lower, the antistatic property is superior. The measurement was performed in an environment in which the temperature was 25° C. and the humidity was 55% RH. Incidentally, in the case of Comparative Example 1, the film was not provided on both surfaces, and therefore, evaluation was performed for arbitrarily selected one surface (the same shall apply also to the following evaluation items).

A: The surface electrical resistance is less than 1E+8Ω/□.
B: The surface electrical resistance is 1E+8Ω/□ or more and less than 1E+9Ω/□.
C: The surface electrical resistance is 1E+9Ω/□ or more and less than 1E+11Ω/□.
D: The surface electrical resistance is 1E+11Ω/□ or more and less than 1E+15Ω/□.
E: The surface electrical resistance is 1E+15Ω/□ or more.

3. Evaluation of Reflectance

With respect to each of the cover glasses produced in the above respective Examples and Comparative Examples, the light reflectance from the cover glass was measured from the surface on the opposite side to the surface on which the film was provided of the base material using a reflectometer USPM manufactured by Olympus Corporation, and evaluation was performed according to the following criteria.

A: The light reflectance is less than 0.3%.
B: The light reflectance is 0.3% or more and less than 0.5%.
C: The light reflectance is 0.5% or more and less than 1.0%.
D: The light reflectance is 1.0% or more and less than 4.0%.
E: The light reflectance is 4.0% or more.

4. Evaluation of Antifogging Property

The antifogging property evaluation index when saturated water vapor was sprayed onto the surface on the side where the film was provided of each of the cover glasses produced in the above respective Examples and Comparative Examples was obtained by using an antifogging property evaluation device (AFA-1 manufactured by Kyowa Interface Science Co., Ltd.), and evaluation was performed according to the following criteria. It can be said that as the antifogging property evaluation index is lower, the antifogging property is superior.

A: The antifogging property evaluation index is less than 3.
B: The antifogging property evaluation index is 3 or more and less than 6.
C: The antifogging property evaluation index is 6 or more and less than 10.
D: The antifogging property evaluation index is 10 or more and less than 20.
E: The antifogging property evaluation index is 20 or more.

5. Evaluation of Adhesiveness

Five horizontal cut lines at 2 mm intervals and five vertical cut lines at 2 mm intervals were provided on the surface to be evaluated with a cutter, and an adhesive tape (CT-18 manufactured by Nichiban Co., Ltd.) was adhered thereto, and thereafter, the adhesive tape was peeled off at a stroke. Then, it was confirmed whether or not peeling occurred on the surface to be evaluated by visual observation, and evaluation was performed according to the following criteria.

A: No film peeling is observed.
B: The percentage of the area where film peeling occurred is less than 5%.

C: The percentage of the area where film peeling occurred is 5% or more and less than 20%.

D: The percentage of the area where film peeling occurred is 20% or more and less than 50%.

E: The percentage of the area where film peeling occurred is 50% or more.

6. Evaluation of Abrasion Resistance

An abrasion resistance test using silbon paper as a counter paper was performed according to JIS K 5701 for the surface on the side where the film was provided of each of the cover glasses produced in the above respective Examples and Comparative Examples. Then, the cover glass after the abrasion resistance test was visually observed, and evaluation was performed according to the following criteria.

A: No scratches by rubbing occur.
B: Almost no scratches by rubbing occur.
C: Scratches by rubbing slightly occur.
D: Scratches by rubbing clearly occur.
E: Scratches by rubbing remarkably occur.

7. Production of Timepiece

By using each of the cover glasses produced in the above respective Examples and Comparative Examples, wristwatches as shown in FIG. 4 were produced. At this time, the surface on the side where the film was provided of the cover glass was disposed facing the inner surface side (a side facing the dial plate and the like).

8. Evaluation of Visibility of Dial Plate of Timepiece

With respect to each of the timepieces produced in the above respective Examples and Comparative Examples, the dial plate and the like were observed through the cover glass, and the visibility at that time was evaluated according to the following criteria.

A: The visibility of the dial plate and the like is very high.
B: The visibility of the dial plate and the like is high.
C: The visibility of the dial plate and the like is within the acceptable range.
D: The visibility of the dial plate and the like is somewhat low.
E: The visibility of the dial plate and the like is very low.

These results are shown in Table 3.

TABLE 3

|  | Antistatic property | Reflectance | Antifogging property | Adhesiveness | Abrasion resistance | Visibility of dial plate |
| --- | --- | --- | --- | --- | --- | --- |
| Example 1 | A | A | A | B | A | A |
| Example 2 | A | B | C | B | A | B |
| Example 3 | C | A | A | B | A | A |
| Example 4 | A | B | A | B | A | B |
| Example 5 | A | A | A | B | A | A |
| Example 6 | A | B | A | B | A | B |
| Example 7 | A | A | A | A | A | A |
| Example 8 | A | A | A | B | A | A |
| Example 9 | A | B | A | A | A | B |
| Comparative Example 1 | E | E | E | — | A | E |
| Comparative Example 2 | E | B | E | A | A | A |
| Comparative Example 3 | D | C | D | C | B | C |
| Comparative Example 4 | B | E | D | C | C | E |
| Comparative Example 5 | E | E | A | D | D | E |

As apparent from Table 3, according to the invention, the optical component had an excellent antistatic function, and also had excellent antireflection function, antifogging property, and abrasion resistance. In particular, an excellent effect as described above was obtained with a simple structure. Further, the timepieces including the optical component had high visibility of the dial plate and the like, and the aesthetic appearance (aestheticity) of the timepiece as a whole was excellent. In addition, according to the invention, the optical component could be produced with high productivity. On the other hand, in the case of Comparative Examples, satisfactory results were not obtained. In particular, in the case of Comparative Example 2 in which a film having a complicated structure such that many layers were stacked was formed by a chemical vapor deposition the productivity of the optical component was particularly low.

When timepieces were produced in the same manner as in the above respective Examples and Comparative Examples except that in addition to the cover glass, also the rear lid was configured in the same manner as described above, the same results as described above were obtained, and in the timepieces to which the optical component according to the invention was applied (timepieces according to the invention), the aesthetic appearance (aestheticity) could be made particularly excellent.

When cover glasses (optical components) and timepieces were produced in the same manner as described above except that the application of the film forming composition was performed by a roll coating method or a spin coating method and the evaluation was performed in the same manner as described above, the same results as described above were obtained.

The entire disclosure of Japanese Patent Application No. 2014-244846, filed Dec. 3, 2014 is expressly incorporated by reference herein.

What is claimed is:

1. An optical component comprising:
a base material; and
a film containing silica particles and conductive transparent metal oxide particles,
when the number-based average particle diameter of the silica particles is represented by Ds (nm) and the number-based average particle diameter of the conductive transparent metal oxide particles is represented by Dc (nm), the following relationship being satisfied: $0.1 \leq Dc/Ds \leq 0.6$.

2. The optical component according to claim 1, wherein the volume resistivity of the conductive transparent metal oxide particles is 100 Ωcm or less.

3. A timepiece comprising the optical component according to claim 2.

4. The optical component according to claim 1, wherein the conductive transparent metal oxide particles are composed of $SnO_2$.

5. A timepiece comprising the optical component according to claim 4.

6. The optical component according to claim 1, wherein the number-based average particle diameter of the conductive transparent metal oxide particles is 0.8 run or more and 5.0 nm or less.

7. A timepiece comprising the optical component according to claim 6.

8. The optical component according to claim 1, wherein the number-based average particle diameter of the silica particles is 0.5 nm or more and 4.0 nm or less.

9. A timepiece comprising the optical component according to claim 8.

10. The optical component according to claim 1, wherein the thickness of the film is 50 nm or more and 120 nm or less.

11. The optical component according to claim 1, wherein the base material is composed of a material containing at least one member selected from the group consisting of a silicate glass, a sapphire glass, and a plastic.

12. A timepiece comprising the optical component according to claim 11.

13. The optical component according to claim 1, wherein the optical component is a cover glass for a timepiece.

14. A timepiece comprising the optical component according to claim 13.

15. A timepiece comprising the optical component according to claim 1.

16. A timepiece comprising the optical component according to claim 10.

17. An optical component comprising:
a base material; and
a film containing silica particles and conductive transparent metal oxide particles,
when the content of the silica particles in the film is represented by Xs (vol %) and the content of the conductive transparent metal oxide particles in the film is represented by Xc (vol %), the following relationship being satisfied: $0.003 \leq Xc/Xs \leq 0.12$.

18. A timepiece comprising the optical component according to claim 17.

* * * * *